Patented Dec. 6, 1927.

1,652,107

UNITED STATES PATENT OFFICE.

OTTO H. ESCHHOLZ, OF PITTSBURGH, PENNSYLVANIA, ASSIGNOR TO WESTINGHOUSE ELECTRIC & MANUFACTURING COMPANY, A CORPORATION OF PENNSYLVANIA.

WELDING ELECTRODE.

No Drawing. Application filed June 5, 1922, Serial No. 566,147. Renewed September 11, 1926.

My invention relates to alloys, more especially to an alloy adapted to be utilized as a fusible electrode or as filling material for electric arc welding.

Heretofore, fusible electrodes or filling material utilized for electric arc welding were composed of iron or its alloys. Such electrodes were frequently coated with various materials, such as asbestos and silicates, to impart various characteristics to the weld or welding process as the result of metal transference, reduction of oxidation, and concentration of the welding arc. However, electrodes of this type do not have the requisite characteristics to permit of their general applicability to welding of ferrous and non-ferrous metals or alloys.

It is among the objects of this invention to provide a welding alloy having the characteristic of becoming very fluid when fused and having the property of readily alloying, penetrating or cementing contacting surfaces of various base metals at a comparatively low welding or fusing temperature.

It is a further object of this invention to provide an alloy that shall be adapted to weld an effective joint between various ferrous and non-ferrous metals and alloys.

I have found that a phosphor copper alloy containing suitable proportions of phosphorus may be utilized for fusible electrodes, either coated or bare, for metal-electrode arc welding, or as filling material for carbon arc welding. In practicing my invention, I provide a copper alloy containing approximately 5 to 10 per cent of phosphorus for welding non-ferrous metals and alloys. This material is capable of effectively welding or brazing such metals to iron and steel on account of its great fluidity, high surface tension and high penetrating power at the welding temperature. The selective oxidation of some phosphorus in such a welding rod during the welding operation, I have found, prevents or decreases the oxidation of copper, thereby producing a sound deposit, while the transferred phosphorus gives the deposited metal the characteristic of flowing freely when fused.

These characteristics are particularly pronounced in the eutectic alloy which contains about 7.3 per cent phosphorus. I have found that a variation of about 2 per cent of phosphorus from the eutectic composition results in decreased fluidity, so that the best results are obtained by keeping the phosphorus content between 7 and 8 per cent, although wider limits may be employed if less fluidity is permissible.

If it is desired to employ the alloy as a bare, fusible electrode, as in automatic arc welding machines where the electrode is fed into the work automatically in a continuous strip, it may be desirable to have an excess of phosphor present to compensate for phosphorus lost by oxidation. The exact amount of phosphorus may vary but should be maintained within several per cent of the eutectic point 7.3 per cent phosphorus.

I have successfully welded copper to copper, brass to brass, brass to steel, copper to steel and also steel to steel with copper alloys having these proportions of phosphorus, and from this it is obvious that it has a variety of uses and is applicable for use as a general welding and brazing metal. My new electrode has also been used to weld the end rings to the conductor bars in making rotors for squirrel cage motors. The welding of heavy sections may be expedited by preheating the base metals.

Although I have described a specific embodiment of my invention, it will be obvious to those skilled in the art that the proportions of phosphorus and copper may be varied to produce welding alloys of desired characteristics for specific applications without departing from the spirit of this invention.

I claim as my invention:

1. A welding rod composed of an alloy consisting essentially of copper and from 5 to 10 per cent phosphorus.

2. A welding rod composed of an alloy consisting essentially of copper and 7.3 per cent phosphorus.

3. A welding rod composed of an alloy consisting of copper and from 5 to 10 per cent phosphorus and having a high degree of fluidity and great penetrating power at the welding temperature.

4. A welding rod or electrode composed of an alloy comprising copper and 7.3 per cent phosphorus and having a high degree of fluidity and great penetrating power at the welding temperature.

5. A welding alloy consisting essentially of copper and from 5 to 10 per cent of phosphorus.

In testimony whereof, I have hereunto subscribed my name this 29th day of May, 1922.

OTTO H. ESCHHOLZ.